Aug. 21, 1951    M. P. LAURENT    2,565,244
PLUG VALVE
Filed July 22, 1948
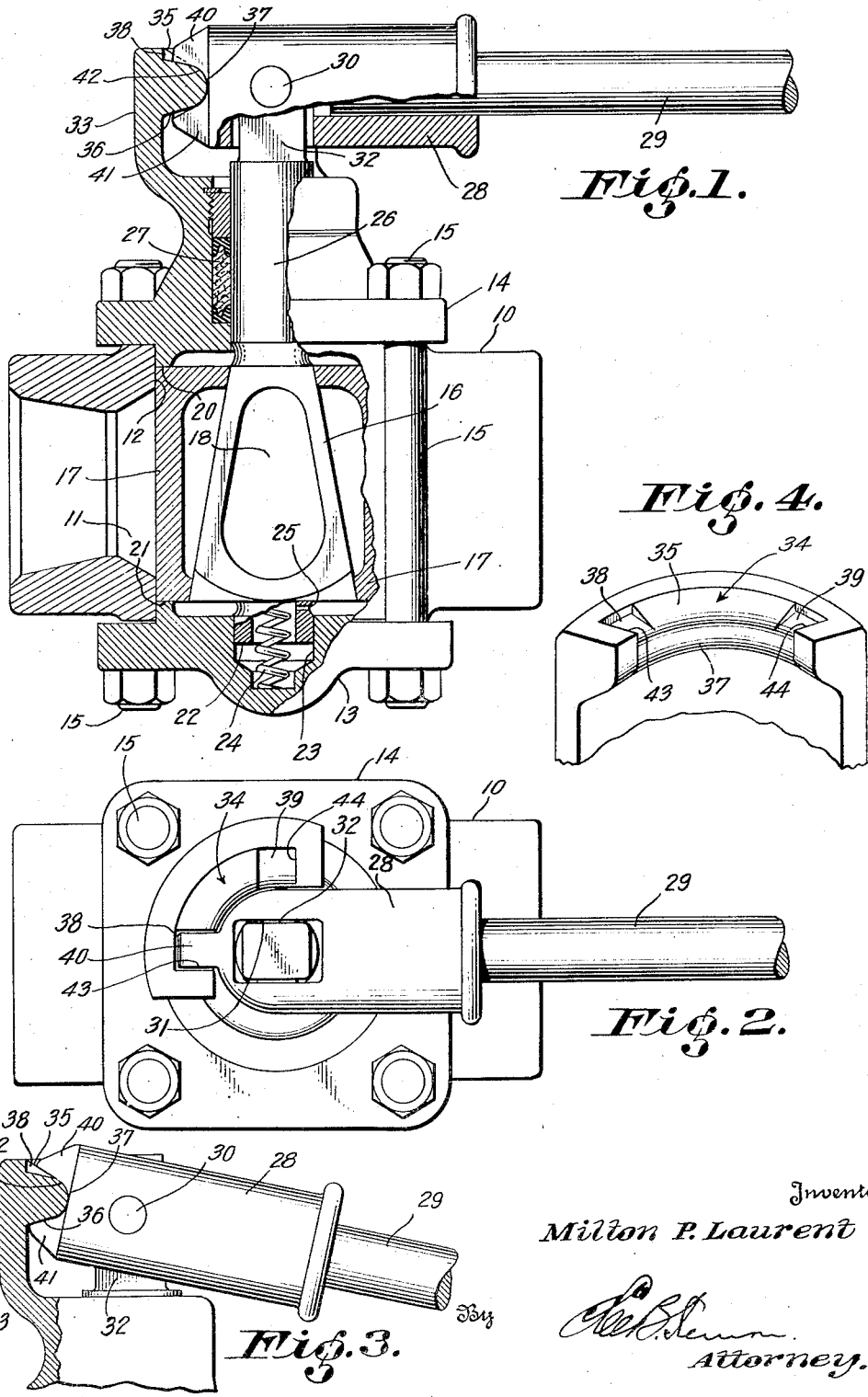
Inventor
Milton P. Laurent
Attorney.

Patented Aug. 21, 1951

2,565,244

UNITED STATES PATENT OFFICE 2,565,244

PLUG VALVE

Milton P. Laurent, Houston, Tex.

Application July 22, 1948, Serial No. 40,029

8 Claims. (Cl. 251—97)

This invention relates to a rotary plug valve and more particularly to a single lever control for a plug valve having an expansible plug, such as that disclosed in my copending application Serial No. 26,606, filed May 12, 1948.

The plug of the valve disclosed in the aforementioned application is cylindrical and of sectional construction, having a central core surrounded by a plurality of segments. The engaging surfaces between the core and the segments are so constructed that relative axial movement therebetween in one direction produces a wedging action that is effective to expand the plug and force the segments into sealing engagement with the wall of the bore forming the valve chamber. Relative axial movement in the other direction acts to positively release the sealing force on all the segments, and contracts certain of the segments out of sealing engagement with the wall of the bore. The segments are fixed against axial movement in the bore. Hence, relative axial movement between the core and the segments is accomplished by moving the core axially in the bore. The valve is opened and closed by rotation of the plug, as in a conventional rotary plug valve. Rotation of the plug is accomplished by rotating the core which carries the segments along as a unit. The axial and rotational movements of the core are accomplished by two independent means, each connected to the valve stem which is secured to and projects axially from the core. The means for effecting rotation of the stem comprises a conventional handwheel or lever secured thereto. The means for effecting axial movement of the stem comprises a second handwheel or lever which is threadedly connected to the valve housing and rotatably connected to the valve stem.

The above described means for operating my improved valve have the disadvantage of necessitating two independent operations in order to seal or unseal and to open or close the valve. A careless workman, having closed the valve, may forget to reseal it. Similarly, he may attempt to open or close the valve without first unsealing it. In the former event, leakage may occur. In the latter event, the valve sealing surfaces may be damaged.

Accordingly, it is an object of this invention to provide a single operating means for accomplishing both axial and rotational movement of the valve stem of my improved rotary plug valve.

It is another object of this invention to provide my improved plug valve with operating means so constructed that the valve cannot be moved between open and closed positions without first unsealing the valve.

It is a further object of this invention to provide automatic means for resealing my improved plug valve when the valve is moved to fully open or fully closed position.

Other objects and advantages of this invention will be apparent from the following description and accompanying drawings, in which:

Figure 1 is an elevational view, partly in section, of a rotary plug valve embodying this invention with the valve shown in closed and sealed position. One of the plug segments has been removed to illustrate details more clearly.

Figure 2 is a plan view of the valve shown in Figure 1.

Figure 3 is a fragmentary view, corresponding to Figure 1, showing the position to which the valve operating mechanism is moved to unseal the valve.

Figure 4 is a fragmentary perspective view of a portion of the valve operating mechanism.

Referring first to Figure 1, there is shown a rotary plug valve embodying the novel features of the invention. The valve illustrated is designed for low or medium pressure use, but it will be understood that this invention may be embodied in high pressure valves as well. The valve has the usual housing 10 provided with aligned ports 11 opening to a cylindrical valve chamber. The valve chamber is formed by a transverse bore 12 in the housing, closed at one end by a closure plate 13 and at the other end by a bonnet 14. The closure plate and the bonnet are secured to the housing by clamping bolts 15, which extend exteriorly of the housing through and between the closure members 13 and 14. Mounted in the valve chamber is a cylindrical valve plug, having a ported frusto-pyramidal core 16. Disposed between each side face of the core and the cylindrical wall of the bore 12 is a segment 17, having an outer arcuate face for sealing engagement with the wall of the bore and a flat inclined inner face extending parallel to the juxtaposed side face of the core 16. Those segments (not shown) overlying the ported side faces of the core have ports therethrough adapted to be registered, exactly, with the housing ports 11, and the core port 18 in the open position of the valve. The opposite ends of the segments 17 are engaged by annular shoulders 20 and 21 projecting into the bore from the bonnet 14 and the closure plate 13, respectively. These shoulders prevent movement of the segments axially of the valve chamber, but permit the segments to rotate as a unit with the core 16.

From the above description, it will be seen that axial movement of the core 16 in one direction, i. e. toward the bonnet 14, produces a wedging action between the core and the segments 17. This wedging action is effective to force the segments radially outwardly of the plug and into sealing engagement with the cylindrical wall of the bore 12. Axial movement of the core in the opposite direction, i. e. toward the closure plate 13, releases the wedging action and, hence, relieves the sealing forces exerted on the segments. Rotation of the core 16 carries the segments 17 along as a unit, to open or close the valve. If desired, the imperforate, or port closing, segments may be so keyed to the core that the unsealing axial movement of the latter contracts these segments radially inwardly to positively move them out of sealing engagement with the wall of the bore. This feature is of particular importance in positively overcoming the adverse effects of a pressure lock situation. Since this situation is of little consequence in a low pressure valve, however, a keyed construction of the segments and core has not been illustrated. Reference is made to the aforementioned application for a more detailed description of the construction and operation of the structure thus far described.

The base of the core 16 is provided with an axially mounted pivotal support 22 which is journaled in a bearing recess 23 formed in the closure plate 13. The support 22 is hollow, as shown, to receive one end of a coil spring 24. The other end of the spring 24 bears against the bottom of the bearing recess. It will thus be seen that the core 16 is yieldingly urged into the sealing position, shown in Figure 1, by the spring 24. A port or vent opening 25 through the side wall of the hollow support 22 adjacent the base of the core 16 permits fluid communication, at all axial or rotational positions of the core, between the bearing recess 23 and the valve chamber. The other end, or apex, of the core 16 is provided with a valve stem 26 which extends through a conventional packing gland 27 in the bonnet 14. From this construction, it will be seen that fluid pressure in the valve chamber assists the spring 24 to urge the core 16 into the valve sealing position. The effective area acted upon by such pressure is equal to the cross-sectional area of the stem 26.

The outer end of the valve stem 26 is pivotally connected to a lever 28 having an operating handle 29. The lever is pivotally connected to the valve stem 26 for movement in a plane extending parallel to the axis of the stem. Such a pivotal connection may be effected by a number of mechanical equivalents. As shown, however, an opening in the lever 28 receives the end of the stem 26, and the two parts are connected by a pin 30. Preferably the opening through the lever 28 and the end of the valve stem received therein have closely adjacent flat parallel sides 31 and 32, respectively, which are disposed normal to the axis of the pin 30. Such a construction enables rotation of the stem 26 by the handle 29 to be accomplished without unduly stressing the pin 30.

Mounted on the bonnet 14 is an upstanding arcuate wall 33 that is concentric with, but spaced from, the valve stem 26. Projecting from the concave side of the wall 33 is a rib 34 (best shown in Figure 4), likewise arcuate and concentric with the valve stem. The rib is disposed substantially in a plane common to the axis of the pivot pin 30 (when the valve is sealed) and extends through somewhat more than 90°. The opposite sides 35 and 36 of the rib 34 are straight in transverse section and converge to a rounded edge 37. Spaced 90° on centers along the rib are two notches 38 and 39 in the upper side 35 thereof, corresponding respectively to the open and closed positions of the valve operating lever 28. The purpose of these notches is described later.

The end of the lever 28 opposite the handle 29 has two narrow projections or arms 40 and 41 spaced apart in a direction normal to the axis of the pin 30. The opposed inner sides of the arms 40 and 41 are substantially flat and converge inwardly to a rounded surface, thus forming, in effect, a short groove 42 between the arms which has sides and a bottom that correspond exactly to the sides 35 and 36 and edge 37 of the rib 34. When the valve is assembled, the rib 34 projects into this groove 42 between the arms.

When the lever 28 is in the rotational position corresponding to the fully open or fully closed position of the valve and the valve stem 26 is in the axial position corresponding to the sealed condition of the valve, the upper arm 40 of the lever is received in one of the rib notches 38 and 39 and the lever assumes the angular position shown in Figure 1. The groove 42 between the arms is so disposed with respect to the longitudinal axis of the lever 28, however, that the intermediate portion of the rib, i. e. that portion extending between the notches 38 and 39, fits into the groove only when the lever is in the angular position, with respect to the rib, shown in Figure 3. Accordingly, the lever 28 must be rocked, about the rounded edge 37 of the rib, into this position, by depressing the handle 29, before the valve stem can be rotated by the handle 29 to move the valve between open and closed positions. Such rocking movement of the lever forces the valve stem 26 axially downward, thus unsealing the valve. When the lever 28 is rotated to move the valve between open and closed position, the close engagement of the upper arm 40 and the groove 42 with the upper side 35 of the rib and the rounded edge 37 maintains the valve in the unsealed position.

With the proportions shown in the drawings, a lever rocking movement of about 8° is sufficient to enable the upper arm 40 to clear the sides of the notches 38 and 39 and thus permit the lever to be operated to rotate the valve plug. Such a rocking movement of the lever will move the valve stem axially a distance sufficient to unseal the valve.

Accordingly, it will be seen that the handle 29 may not be rotated to move the valve plug between open and closed positions until the handle is depressed to enable the upper arm 40 of the lever to clear the sides of the notches. Depressing the handle, however, moves the valve stem axially inward against the action of the spring 24 and fluid pressure, if any, thus unsealing the valve. During rotation of the valve stem between open and closed positions of the valve, the engagement of the arms with the sides of the rib prevents outward axial movement of the valve stem from the unsealed position. When the valve reaches a fully open or fully closed position, however, the notches receive the upper arm 40 to permit the valve stem to be moved axially outward into sealed position by the axially biasing forces (the spring 24 and fluid pressure) acting thereon.

The ends of the rib 34 are provided with stop walls 43 and 44 forming continuations of the remote walls of the notches 38 and 39, respectively. These stop walls extend above the upper side 35 of the rib to be engaged by the upper arm 40 of the lever and so stop further rotation of the stem 26 in order to prevent overrunning the open or closed position of the valve in the event that the notches are not automatically engaged by the upper arm.

It will thus be seen that this invention provides a single lever control for a rotary plug valve having a valve-stem-operated expansible plug. The valve cannot be moved between open and closed positions without first unsealing the valve. In addition, the valve is automatically sealed when in fully open or fully closed position.

It is obvious that the invention may be applied to other types of rotary plug valves; for example, to a valve having a tapered rotary plug which is unseated by axial movement to unseal the valve. The principles of the invention also easily may be utilized to provide a single lever control for a multi-way plug valve. It will be seen, as well, that the notches in the rib will be in the bottom side thereof in the event that outward movement of the valve stem unseats the valve. Furthermore, the specific structure illustrated and described is subject to various modifications by one skilled in the art without departing from the principles of the invention. Therefore, the invention encompasses all embodiments which come within the spirit and scope of the following claims.

I claim:

1. In a rotary plug valve of the type having a housing from which a valve stem projects and in which rotary movement of the valve stem controls fluid flow through the valve and axial movement of the stem controls the application of seating forces to the sealing surfaces of the valve, operating means for the valve stem comprising: a member mounted on the valve housing having an arcuate portion substantially concentric with the projecting end of the valve stem; a stem rotating lever pivotally connected to the stem end for movement relative thereto about an axis perpendicular to the axis of the stem; mechanical means effecting close interfitting engagement between one end of said lever and said arcuate portion for maintaining said lever against movement about said axis during rotation of the valve stem between selected fluid flow controlling positions thereof, the stem during said rotation being in the axial position which relieves the valve seating forces; and notch means in and spaced along said arcuate portion corresponding respectively to selected fluid flow controlling rotational positions of said lever, said notch means, when said one lever end is aligned with any one thereof, permitting movement of said one lever end about said axis to effect axial movement of the stem in a direction to apply the valve seating forces, and, when the stem is in the axial position which applies the seating forces, preventing rotary movement of said lever.

2. In a rotary plug valve of the type having a housing from which a valve stem projects and in which rotary movement of the valve stem controls fluid flow through the valve and axial movement of the stem controls the application of seating forces to the sealing surfaces of the valve, operating means for the valve stem comprising: an inwardly directed arcuate rib mounted on the valve housing substantially concentric with the projecting end of the valve stem; a stem rotating lever pivotally connected to the stem end for movement relative thereto about an axis perpendicular to the axis of the stem, said lever having groove means engaging said rib for maintaining said lever against movement about said axis during rotation of the stem between selected fluid flow controlling positions thereof, the stem during said rotation being in the axial position which relieves the valve seating forces; and means defining lever receiving notches in and spaced along one side of said rib corresponding respectively to selected fluid flow controlling positions of said lever, said notches, when said lever is aligned with any one thereof, permitting movement of said lever about said axis to effect axial movement of the stem in a direction to apply the valve seating forces, and, when the stem is in the axial position which applies the valve seating forces, preventing rotary movement of said lever.

3. In a rotary plug valve of the type having a housing from which a valve stem projects and in which rotary movement of the valve stem controls fluid flow through the valve and axial movement of the stem controls the application of seating forces to the sealing surfaces of the valve, operating means for the valve stem comprising: an inwardly directed arcuate rib mounted on the valve housing substantially concentric with the projecting end of the valve stem; a stem rotating lever pivotally connected to the stem end for movement relative thereto about an axis perpendicular to the axis of the stem, said lever having groove means engaging said rib for maintaining said lever against movement about said axis during rotation of the stem between selected fluid flow controlling positions thereof, the stem during said rotation being in the axial position which relieves the valve seating forces; means yieldably urging the stem axially in a direction to apply the valve seating forces; and means defining lever receiving notches in and spaced along that side of the rib facing in said direction, said notches corresponding respectively to selected fluid flow controlling positions of said lever and, when said lever is aligned with any one thereof, permitting movement of said lever about said axis to allow axial movement of the stem in a direction to apply the valve seating forces, and, when the stem is in the axial position which applies the valve seating forces, preventing rotary movement of the stem.

4. The structure defined by claim 3, in which the means yieldably urging the stem axially comprises a spring.

5. The structure defined by claim 3, in which the means yieldably urging the stem axially is responsive to fluid pressure in the valve chamber.

6. In a rotary plug valve of the type having a housing from which a valve stem projects and in which rotary movement of the valve stem controls fluid flow through the valve and axial movement of the stem controls the application of seating forces to the sealing surfaces of the valve, operating means for the valve stem comprising: an inwardly directed arcuate rib mounted on the valve housing substantially concentric with the projecting end of the valve stem; a stem rotating lever pivotally connected to the stem end for movement relative thereto about an axis perpendicular to the axis of the stem, said lever having groove means engaging said rib for maintaining said lever against movement about said axis during rotation of the stem between the valve open and valve closed positions thereof; the stem during said rotation being in the axial position which relieves the valve seating forces; means yieldably urging the stem axially in a direction to apply the valve seating forces; means defining two lever receiving notches in and spaced along that side of said rib facing in said direction, said notches corresponding respectively to the valve open and valve closed positions of said lever, and, when said lever is aligned with either one thereof, permitting movement of said lever about said axis to allow axial movement of the stem in a direction to apply the valve seating forces and, when the stem is in the axial position which applies the valve seating forces, preventing rotary movement of the stem; and stop means on said rib adjacent each of said notches to prevent said lever from overrunning said valve open or said valve closed positions thereof.

7. A rotary plug valve comprising: a housing provided with a cylindrical chamber having diametrically opposed ports opening through the side wall thereof; an expansible cylindrical ported valve plug mounted for rotation in said chamber; a valve stem projecting axially from said plug to the exterior of said housing, rotation of said stem being effective to control fluid flow through the valve and axial movement of said stem being effective to expand said plug into sealing engagement with said chamber side wall; an inwardly directed arcuate rib mounted on said housing substantially concentric with the projecting end of said stem, the opposite sides of said rib being substantially straight in transverse section; a stem rotating lever pivotally connected intermediate the ends thereof to said stem end for movement about an axis perpendicular to the axis of said stem, one end of said lever being bifurcated to provide two arms having substantially flat opposed sides closely engaging said opposite sides of said rib for maintaining said stem in the plug-contracted axial position during rotation thereof between valve open and valve closed positions; means in said housing for yieldably urging said stem axially in a direction to expand said plug; and means defining lever arm receiving notches in and spaced along one side of said rib, said notches corresponding respectively to the valve open and valve closed positions of said lever end, the alignment of said lever end with either of said notches permitting the corresponding lever arm to be received therein to allow axial movement of said stem into plug-expanding position, and, when said stem is in said plug-expanding position, preventing rotary movement of said lever.

8. In a device of the character described, a rod adapted for successive axial and rotational movements, a member mounted on a fixed support and having an arcuate portion substantially concentric with one end of said rod, a rod-rotating lever pivotally connected to said one rod end for movement relative thereto about an axis perpendicular to the axis of said rod, mechanical means effecting close interfitting engagement between one end of said lever and said arcuate portion for maintaining said lever against movement about said axis during rotation of said rod by said lever, and notch means in and spaced along said arcuate portion, said notch means, when said one lever end is aligned with any one thereof, permitting movement of said lever about said axis to effect axial movement of said rod.

MILTON P. LAURENT.

REFERENCES CITED

The following references are of record in the file of this patent:

UNITED STATES PATENTS

| Number | Name | Date |
|---|---|---|
| 1,803,773 | Schmidt | May 5, 1931 |
| 2,311,989 | McGill | Feb. 23, 1943 |
| 2,376,975 | Morgan | May 29, 1945 |
| 2,443,995 | Snyder | June 22, 1948 |
| 2,517,311 | Hill et al. | Aug. 1, 1950 |

FOREIGN PATENTS

| Number | Country | Date |
|---|---|---|
| 626,800 | France | of 1927 |